Sept. 15, 1970   P. E. HORN   3,528,446
SERVO VALVE WITH RESILIENTLY MOUNTED JET PIPE
Filed Feb. 27, 1968

INVENTOR.
PAUL E. HORN
BY
ATTORNEYS

United States Patent Office 3,528,446
Patented Sept. 15, 1970

3,528,446
SERVO VALVE WITH RESILIENTLY MOUNTED JET PIPE
Paul E. Horn, Troy, Mich., assignor to Sperry Rand Corporation, Troy, Mich., a corporation of Delaware
Filed Feb. 27, 1968, Ser. No. 708,649
Int. Cl. F15c 3/12
U.S. Cl. 137—83                   2 Claims

ABSTRACT OF THE DISCLOSURE

A mounting arrangement for a servo control device of the jet pipe type wherein a tubular jet pipe has a fluid nozzle at one end and having a flange or an annular collar at the other end. The jet pipe is mounted by encasing the end having the flange in resilient means which, in turn, is contained within a cavity of a stationary mounting member.

BACKGROUND OF THE INVENTION

This invention pertains to power transmission and is particularly applicable to fluid pressure energy translating devices and specifically to servo control devices of the jet pipe type. More specifically, this invention pertains to a unique and inexpensive arrangement for mounting the jet pipe. Servo control valves of this general classification usually require, in combination, a jet pipe of considerable length and substantial input power to provide satisfactory performance or some elaborate and intricate mounting arrangement to achieve optimum performance.

The prior art discloses various methods of mounting a jet pipe. One method is the cantilever arrangement wherein the end opposite the nozzle is rigidly retained. The disadvantage with this arrangement is that the jet pipe must be sufficiently long enough to obtain the required deflection with a reasonable input power. Thus, the input power required to actuate the jet pipe increases as the length is reduced. Another method of mounting shown in the prior art is where the jet pipe is torsionly mounted. That is, one or more torsion members are attached to the jet pipe at one end with the other end of the torsion member securely retained within the housing. This method has disadvantages similar to that of the cantilever method with respect to input power. In addition, such torsion members are expensive and the accuracy of such devices in production, due to manufacturing tolerance, is inconsistent. Other methods which include such arrangements as bearing mounted jet pipes, though providing satisfactory operation, are extremely expensive to manufacture.

Another factor which presents a major obstacle to a satisfactory mounting arrangement is the problem of providing a fluid tight communication betwen the source of fluid pressure and the jet pipe.

SUMMARY

The present invention eliminates the problems and disadvantages present in the prior art devices by incorporating a resilient material for mounting the jet pipe.

An object of the present invention is to provide a mounting arrangement for a jet pipe of a servo control device wherein the length of the jet pipe is greatly reduced.

Another object of the present invention is to provide a mounting arrangement for a jet pipe wherein the input power necessary to actuate the jet pipe is minimal.

Another object of the present invention is to provide such a mounting arrangement which provides a fluid tight seal between the source of fluid pressure supply and the jet pipe and the interior of the valve body.

A further object of the present invention is to provide a mounting arrangement for a jet pipe that is low in cost and provides accurate and consistent operation between valves when manufactured in production quantities.

Further objects and advantages of the present invention will be apparent from the following description, reference being made to the accompanying drawing wherein a preferred form of the present invention is clearly shown.

IN THE DRAWINGS

Figures 1, 2, 3, 4:
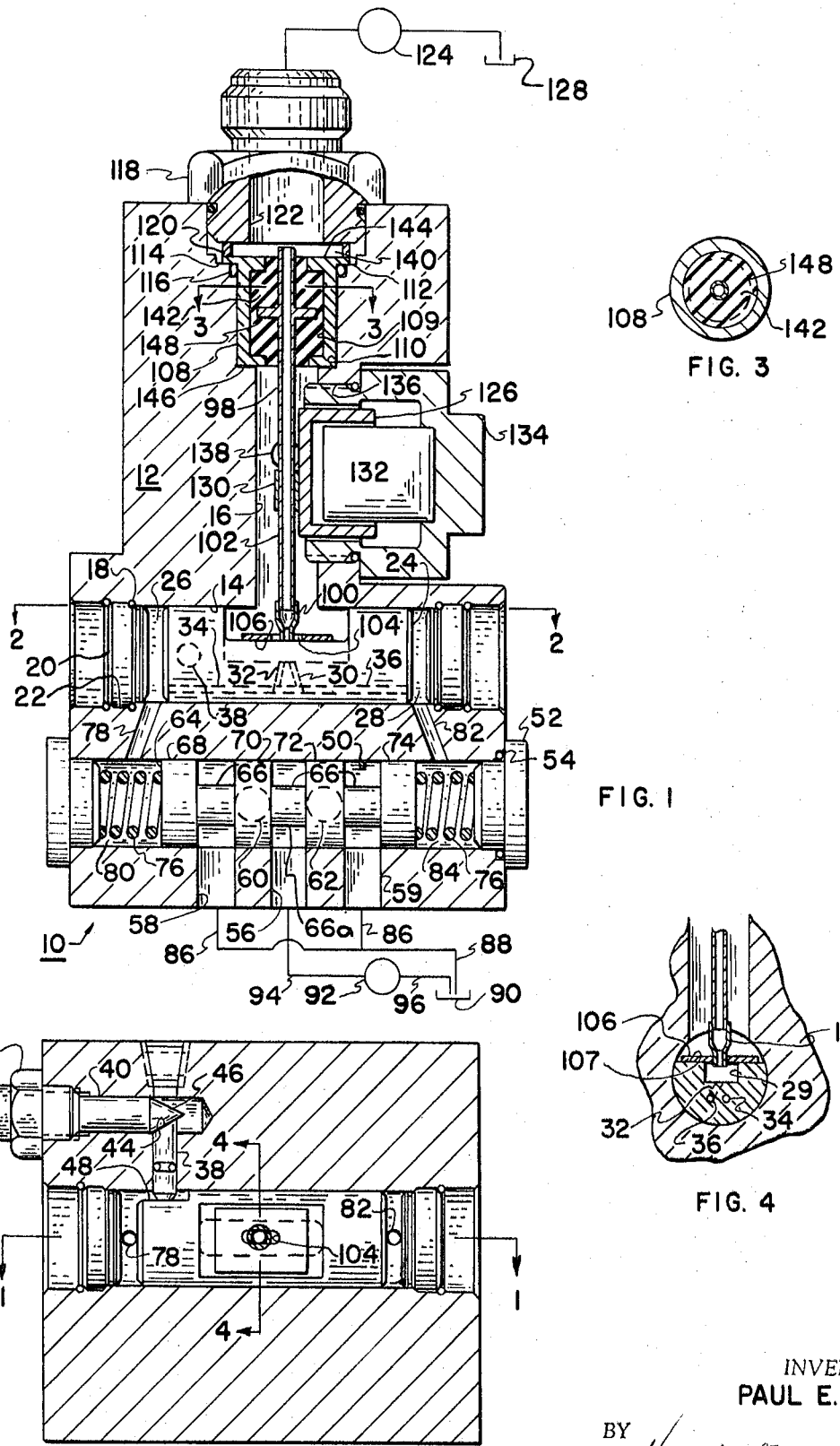
FIG. 1 is a cross sectional view of a servo control device embodying the present invention and taken on line 1—1 of FIG. 2.
FIG. 2 is a sectional view taken on line 2—2 of FIG. 1.
FIG. 3 is a partial sectional view taken on line 3—3 of FIG 1.
FIG. 4 is a partial sectional view taken on line 4—4 of FIG. 2.

Referring now to FIG. 1, the embodiment of the invention selected for illustration comprises a servo control device 10 having a body 12. Body 12 has a horizontal bore 14 and a vertical bore 16, the axes of which intersect perpendicularly. Bore 14 is fluid tightly sealed at each end by O-ring seals 18 which are maintained in position by nuts 20 which are threaded into threaded sections 22 arranged at each end of the bore 14. A receiver spool 24 is slidably fitted in bore 14 providing fluid chambers 26 and 28 at each end thereof. The spool 24 is provided with a recess 29 (FIG. 4) having receiver passages 30 and 32. Passage 30 communicates with chamber 26 by means of a passage 34, and receiver passage 32 communicates with chamber 28 by means of a passage 36. Spool 24 is held in place by a locking device which comprises a pin 38 and a set screw 40 and a locking nut 42 (FIG. 2). The pin 38 has a tapered end 44 which is engaged by the cone-shaped tip 46 of the set screw 40. Thus, when the spool 24 is properly positioned, it may be held in place by adjusting the set screw 40 inward until the pin 38 contacts the flat 48 on the lefthand end of the spool 24.

The body 12 has a bore 50 arranged horizontally below bore 14 which is closed at each end by end caps 52 and fluid tightly sealed with O-rings 54. The body 12 has a plurality of external ports which communicate with bore 50. A pressure port 56 is centrally located axially within the bore 50. On each side of the pressure port 56 are tank ports 58 and 59. Cylinder ports 60 and 62 are arranged outwardly of the pressure port, but inwardly of the tank ports.

A second-stage spool 64 is slidably fitted to bore 50 for movement within the bore. The spool 64 is provided with three annular grooves 66, to form control lands 68, 70, 72, and 74. The width of the annular grooves 66 and the control lands 70 and 72 are substantially equal, such that when the spool is centered, communicating the pressure port 56 with the center annular groove 66a, the lands 70 and 72 cover the cylinder ports 60 and 62. At the same time, the space between the pressure port 56 and the tank ports 58 and 59 is substantially equal to the width of the control lands 70 and 72, therefore preventing communication between the cylinder ports and the tank ports when the spool is centered. Springs 76, arranged at each end of the bore 50, act against the end caps 52 and the spool to position the spool 64 in a central position. A passage 78 communicates the chamber 26 with a chamber 80 provided in the left-hand end of the spool, and passage 82 communicates chamber 28 with a chamber 84 at the righthand end of the spool.

Though not forming a part of the invention, the tank ports are connected by conduits 86 and 88 to a reservoir 90. The pressure port is connected to a source of fluid pressure such as a hydraulic pump 92 by conduits 94. The pump, in turn, has a suction line 96 connected to the reservoir 90.

A jet pipe assembly 98 is positioned in the vertical bore 16 and extends into the horizontal bore 14. A nozzle 100 is arranged on the lower end of a jet pipe tube 102. The nozzle extends through an oblong-shaped opening 104 in a nozzle guide plate 106 which is mounted on a flat surface 107 of the spool 24 and attached thereto by means not shown. The oblong opening 104 allows the spool to move axially with respect to the passages 30 and 32 but prevents transverse movement of the nozzle 100. The upper end of the jet pipe assembly 98 comprises a stationary mounting member 108 having substantially a tubular cross section, thus forming a mounting cavity 109. The stationary mounting member 108 is tightly fitted in an enlarged counterbore 110. The upper end of the stationary valve member has an enlarged shoulder 112 which abuts a recessed shoulder 114. An O-ring 116 is provided at the underside of the shoulder 12 to prevent external fluid leakage. The stationary valve member is held in place by a fluid coupling 118 which has an extension threaded into the body 12 which abuts annular ring 120 which, in turn, abuts shoulder 112. The fluid coupling is provided with a through passage 122 through which fluid passes from an external power source such as a fluid pump indicated by the numeral 124 and a reservoir 128. A circular cup-shaped electrical coil 126 is secured to the jet pipe tube 102 by fastening collar 130 which is secured to the coil 126 by means not shown, such that movement of the coil 126 actuates the tube 102. A cylindrical magnet 132 is secured in a mounting retainer 134 which, in turn, is threaded into the body 12 at 136. Electrical leads of the coil 126 extending through the passage 16 and a passage 138 to an electrical connector, not shown, for connection to an external power source. The upper end of the tube 102 extends axially through the stationary mounting member 108 and into the cavity 140 which lies below the fluid coupling 118.

A resilient mounting member 142 is provided in the cavity 109 formed between the outer periphery of the tube 102 and the inner wall of the stationary mounting member 108, and extends axially to the outer surfaces 144 and 146 of the stationary mounting member. The resilient mounting member is fluid tightly fitted in the cavity and to the tube and a flange 148 to prevent fluid leakage from the source of fluid pressure into the bore 16. Flange 148 is secured to the tube 102 and lies in a plane perpendicular to the axis of the tube. Thus, the resilient material surrounds this flange which, in turn, will prevent substantial axial movement of the tube 102 within the axial mounting member 108 and which provides additional resisting force to the movement of the tube 102. The resilient material is composed of an elastomeric type material such as, but not limited to, rubber, for example.

In operation, referring to FIG. 1, pump 124 supplies fluid to the servo valve control device 10 through fluid coupling 118. This fluid is supplied at substantially a constant pressure; for example, 500 p.s.i. The fluid flows through passage 122 and into the chamber 140 above the stationary mounting member 108. The fluid then flows through the jet tube 102 to nozzle 100. The fluid is then discharged from the nozzle in a fluid jet which impinges upon the receiver spool 24. When the jet tube 102 is in a neutral, or null position, the fluid as it impinges upon the receiver spool 24 is distributed equally through passages 30 and 32 and through passages 34 and 36 to chambers 26 and 28, wherein the pressures will be equal. Since the chambers 80 and 84 are in communication with chambers 26 and 28 by passages 78 and 82, respectively, the pressure on each side of the spool 64 will be equal, and thus, spool 64 will be held in a centered position as shown in FIG. 1. When an electrical input signal is imposed upon the coil 126, the coil will either move toward the magnet 132, or away from the magnet 132, depending upon the sense of the input signal. For the purposes of explanation, assume that a positive input signal will cause the coil to move toward the magnet 132, and a negative input signal will cause the coil to move away from the magnet 132. The magnitude of the input signal determines the amount of movement of the jet tube 102. When a positive input signal is imposed upon the coil 126, the nozzle 100 will move to the right, creating a differential pressure across holes 30 and 32 and through passages 34 and 36. Thus, the pressure in chamber 26 will be greater than that in chamber 28. As a result, pressure in chamber 80 will be greater than that in chamber 84, causing the spool to shift to the right. When this occurs, the pressure port 56 will be in communication with cylinder port 62, and cylinder port 60 will be connected to tank port 58. Similarly, when a negative input signal is imposed upon coil 126, the jet tube 102 moves toward the left, increasing the pressure in chambers 28 and 84 to a value greater than in chambers 26 and 80. As a result, the spool 64 will move to the left, connecting the pressure port with cylinder port 60 and connecting cylinder port 62 with tank port 59. Thus, the direction and quantity of the fluid supplied by pump 92 may be directed to either cylinder port 60 or 62, depending upon the sense and magnitude of the input signal.

The resilient mounting 142 in cavity 109 provides the return force, or opposing force, to the electrical input signal. Thus, when an input signal is imposed upon the coil 126, the tube is actuated in one direction or the other, pivoting about a point near the point formed by the axis of the jet tube 102 and the plane of the flange 148. As the jet tube moves, the resilient material is deformed both by the movement of the tube itself, and the flange 148. Therefore, when the electrical input signal is removed from the coil 126, the resilient material within the cavity 142 seeks to return to its natural shape, forcing the jet tube back to its neutral position. Since the resilient material is readily deformed, the magnitude of the electrical input signal can be minimal to achieve maximum movement of the jet tube.

It will thus be seen that the use of a resilient material for mounting a jet tube will greatly reduce the amount of electrical input power necessary to actuate the jet tube.

It will further be seen that the length of the jet tube can be reduced considerably, since deflection of the jet tube is not relied upon for movement of the nozzle.

And further, it will be seen that the cost of such a resilient mounting member is extremely inexpensive as compared to the aforementioned prior art devices. In addition, when such devices are manufactured in production quantities, the consistency of performance with respect to input power is easily achieved, due to the fact that using a resilient material with identical physical characteristics in each device will produce identical performance characteristics from one device to another.

What is claimed is as follows:

1. A jet pipe servo control device comprising a valve body having a bore with a mounting cavity formed within one end thereof; a tubular control member within said body having a fluid nozzle arranged on one end thereof with a portion of said tubular member being disposed within said mounting cavity with said nozzle extending into said bore; a source of fluid pressure in communication with the end of said control member opposite said nozzle and adapted to communicate with said bore via said tubular member and said nozzle; and input means for actuating said member from a neutral position to a plurality of operating positions on either side of said neutral position; and, a resilient means for pivotally mounting said tubular member within said cavity, said resilient means comprising an elastomeric material surrounding said portion of said member and engaging the walls of said cavity for providing the dual function of forming a fluid tight seal so as to prevent fluid communication between said source and said bore while simultaneously opposing movement of said tubular member when said input means are actuated and restoring said tubular member to its neutral position when said input means are deactuated, said portion of said member having a flange positioned thereon extending radially outward from said tubular member and being within said material to form a fluid tight relationship between said material and said flange to aid in preventing axial movement of said tubular member.

2. A device, as described in claim 1, wherein said input means is attached to said tubular member between said nozzle and said resilient means.

References Cited
UNITED STATES PATENTS

| | | | |
|---|---|---|---|
| 627,671 | 6/1899 | Kelly | 74—18.1 XR |
| 2,255,322 | 9/1941 | Langdon. | |
| 2,417,108 | 3/1947 | Guibert et al. | 74—19.1 XR |
| 2,742,919 | 4/1956 | Ray | 91—3 XR |
| 3,017,864 | 1/1962 | Atchley | 91—3 |
| 3,303,852 | 2/1967 | Miller | 74—18.1 XR |

ROBERT G. NILSON, Primary Examiner

U.S. Cl. X.R.

137—625.63, 625.64